(12) United States Patent
Smith, Jr. et al.

(10) Patent No.: US 12,704,165 B2
(45) Date of Patent: Aug. 11, 2026

(54) DUAL PISTON SHOCK ASSEMBLY

(71) Applicant: Fox Factory, Inc., Duluth, GA (US)

(72) Inventors: Bobby Lee Smith, Jr., Alpine, CA (US); Geoffrey Tyler Carlisle, San Diego, CA (US)

(73) Assignee: Fox Factory, Inc., Duluth, GA (US)

( * ) Notice: Subject to any disclaimer, the term of this patent is extended or adjusted under 35 U.S.C. 154(b) by 426 days.

(21) Appl. No.: 18/382,324

(22) Filed: Oct. 20, 2023

(65) Prior Publication Data

US 2025/0129833 A1 Apr. 24, 2025

(51) Int. Cl.
*F16F 9/18* (2006.01)
*F16F 9/02* (2006.01)
*F16F 9/06* (2006.01)
*F16F 9/44* (2006.01)
*F16F 9/48* (2006.01)

(52) U.S. Cl.
CPC .............. *F16F 9/0227* (2013.01); *F16F 9/44* (2013.01)

(58) Field of Classification Search
CPC .......... F16F 9/0227; F16F 9/063; F16F 9/065; F16F 9/18; F16F 9/185; F16F 9/44; F16F 9/48
See application file for complete search history.

(56) References Cited

U.S. PATENT DOCUMENTS 4,732,244 A * 3/1988 Verkuylen .............. F16F 9/467 188/315
5,351,790 A * 10/1994 Machida .............. B60G 13/003 188/266.2
5,597,054 A * 1/1997 Nagai ....................... F16F 9/46 188/315
5,957,252 A * 9/1999 Berthold ................ B60G 11/30 188/314
6,029,958 A * 2/2000 Larsson .................. F16F 9/342 267/113
6,120,049 A * 9/2000 Gonzalez .................. F16F 9/56 188/322.22
6,254,067 B1 * 7/2001 Yih ......................... F16F 9/446 267/64.22
6,296,092 B1 10/2001 Marking et al.
6,776,269 B1 8/2004 Schel
7,325,660 B2 * 2/2008 Norgaard ............. F16F 9/3235 188/310
7,374,028 B2 5/2008 Fox
7,484,603 B2 2/2009 Fox
8,381,887 B2 2/2013 Sawai
8,567,576 B2 * 10/2013 Ripa ......................... F16F 9/44 188/314
8,807,302 B2 * 8/2014 Nygren ................... F16F 9/516 188/322.22

(Continued)

*Primary Examiner* — Thomas W Irvin

(57) ABSTRACT

A dual piston shock assembly is disclosed. The dual piston shock assembly includes a body with a chamber having working fluid therein. A dual piston assembly coupled with a shaft, the dual piston assembly including a compression piston, a rebound piston, and a reservoir port coupled between the compression piston and the rebound piston along an axis of the shaft. The dual piston assembly disposed in the chamber, axially movable relative to the chamber, and separating the chamber into a compression side and a rebound side. A fluid pathway internal to the shaft, the fluid pathway fluidly coupling the chamber with a reservoir via the reservoir port.

19 Claims, 4 Drawing Sheets

(56) References Cited

U.S. PATENT DOCUMENTS

| | | | | |
|---|---|---|---|---|
| 8,838,335 | B2 | 9/2014 | Bass et al. | |
| 8,955,653 | B2 | 2/2015 | Marking | |
| 9,303,712 | B2 | 4/2016 | Cox | |
| 9,353,818 | B2 | 5/2016 | Marking | |
| 9,623,716 | B2 | 4/2017 | Cox | |
| 9,682,604 | B2 | 6/2017 | Cox et al. | |
| 9,797,467 | B2 | 10/2017 | Wootten et al. | |
| 10,036,443 | B2 | 7/2018 | Galasso et al. | |
| 10,060,499 | B2 | 8/2018 | Ericksen et al. | |
| 10,415,662 | B2 | 9/2019 | Marking | |
| 10,443,671 | B2 | 10/2019 | Marking | |
| 10,576,803 | B2 | 3/2020 | Marking et al. | |
| 10,737,546 | B2 | 8/2020 | Tong | |
| 10,759,247 | B2 | 9/2020 | Galasso et al. | |
| 11,131,361 | B2 | 9/2021 | Cox | |
| 11,162,555 | B2 | 11/2021 | Haugen | |
| 11,459,050 | B2 | 10/2022 | Allinger et al. | |
| 11,927,242 | B2* | 3/2024 | Smith | B60G 17/08 |
| 12,227,048 | B2* | 2/2025 | D'Orazio | F16F 9/5126 |
| 2006/0096817 | A1* | 5/2006 | Norgaard | F16F 9/3235 188/275 |
| 2011/0017557 | A1* | 1/2011 | Nygren | F16F 9/3405 188/282.5 |
| 2011/0147148 | A1* | 6/2011 | Ripa | F16F 9/065 188/266 |
| 2014/0042724 | A1* | 2/2014 | Batsch | F16F 9/062 267/226 |
| 2021/0381574 | A1* | 12/2021 | Smith | F16F 9/466 |
| 2024/0286452 | A1* | 8/2024 | Jensen | B60G 17/08 |
| 2025/0313055 | A1* | 10/2025 | Laird | B60G 17/0523 |

* cited by examiner

DUAL PISTON SHOCK ASSEMBLY

FIELD OF THE INVENTION

Embodiments of the invention generally relate to a shock assembly.

BACKGROUND

Shock assemblies are used in numerous different vehicles, devices, or the like and configurations to absorb some or all of a movement that is received at a first portion of a vehicle, device, or the like before it is transmitted to a second portion of the vehicle, device, or the like. For example, when a front wheel of a vehicle hits a rough spot, the encounter will cause an impact force on the wheel. By utilizing suspension components including one or more shock assemblies, the impact force can be significantly reduced or even absorbed completely by the suspension before it is transmitted to a suspended portion of the vehicle.

In a shock assembly, cavitation happens when there's a pressure differential across the main piston when the piston is moving in either a compression stroke or a rebound stroke. Cavitation causes performance degradation as the fluid becomes aerated. E.g., inconsistencies are introduced in the fluid which can result in inconsistencies in damping characteristics and/or performance. These performance differences are simply illustrated as a comparison between moving an object (e.g., the damping piston) through a fluid versus moving it through a foam. In a liquid, there is basically no compression of the fluid as pressure is added and as such, the liquid will act uniformly and consistently across different pressure ranges. In contrast, as pressure is added to a foam, the gasses within the foam can be compressed while the fluid will remain incompressible. As such, the foam will act non-uniformly and inconsistently across different pressure ranges.

In addition, cavitation will cause the fluid to start breaking down quicker causing the fluid life to be reduced. As such, it is an ongoing goal to reduce or remove cavitation from a shock assembly.

BRIEF DESCRIPTION OF THE DRAWINGS

Aspects of the present invention are illustrated by way of example, and not by way of limitation, in the accompanying drawings, wherein.

Figure 1:
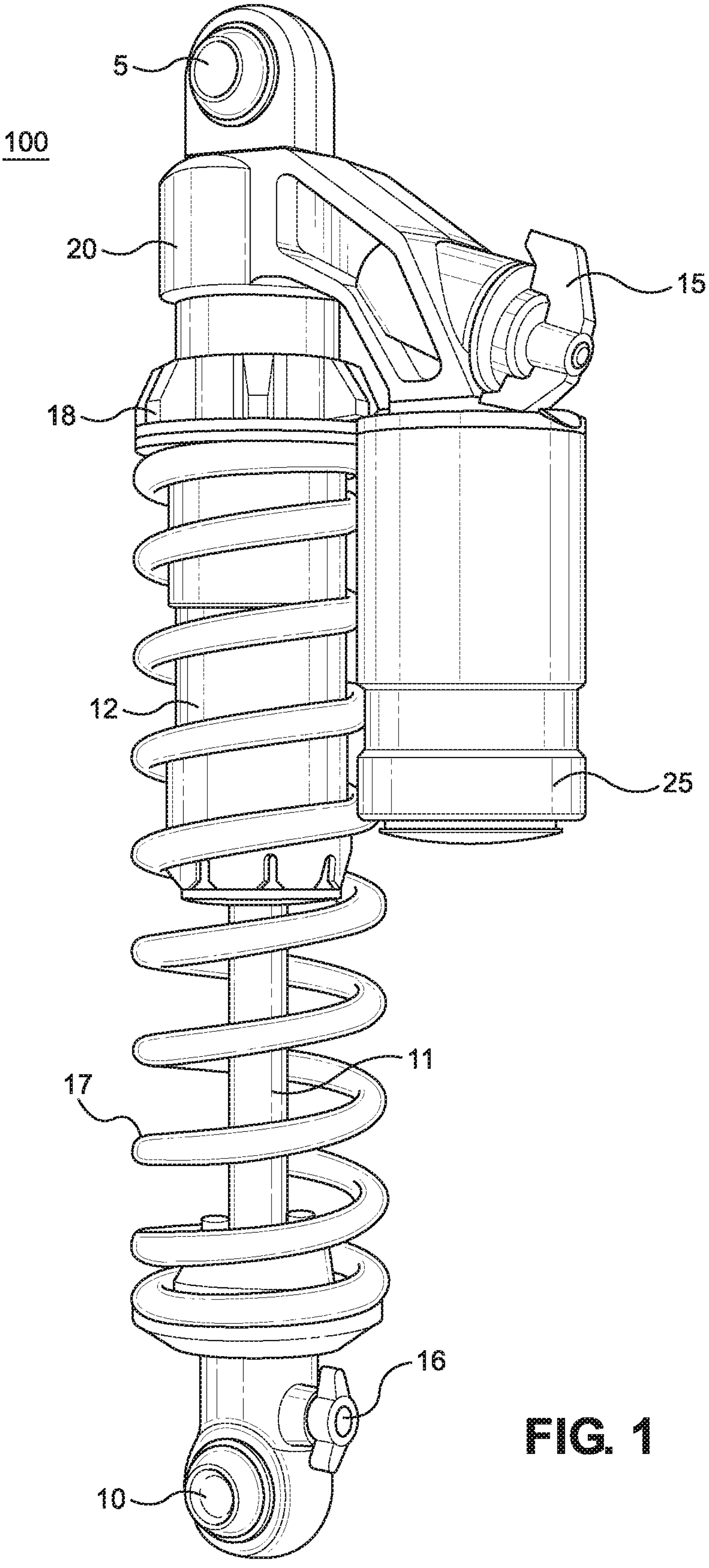
FIG. 1 is a perspective view of a dual piston shock assembly, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Terminology

In the following discussion, a number of terms and directional language is utilized. It should be appreciated that the dual piston shock assembly described herein can be used with a number of different suspension systems that use one or more shock assemblies. Examples of applications include one or more shock assemblies on vehicles such as, but not limited to a bicycle, an electric bike (e-bike), a hybrid bike, a scooter, a motorcycle, an ATV, a personal water craft (PWC), a vehicle with three or more wheels (e.g., a UTV such as a side-by-side, a car, truck, etc.), a snow machine, an aircraft, and the like. In one embodiment, the dual piston shock assembly disclosed herein is also suited for use in one or more shock assemblies of a suspension inclusive device such as, but not limited to, an exoskeleton, a seat frame, a prosthetic, a suspended floor, and the like.

In general, a suspension system provides a motion modifiable connection between a component that is in contact with a surface (e.g., an unsprung portion) and some or all of the rest of the device that is not in contact with the surface (e.g., a suspended portion).

For example, in a suspension system for a vehicle, the unsprung portion of the vehicle that is in contact with the surface can include one or more wheel(s), skis, tracks, hulls, etc., while some or all of the rest of the vehicle that is not in contact with the surface include suspended portions such as a frame, a seat, handlebars, engines, cranks, etc.

The suspension system will include one or numerous components which are used to couple the unsprung portion of the vehicle (e.g., wheels, skids, wings, belt, etc.) with the suspended portion of the vehicle (e.g., seat, cockpit, passenger area, cargo area, etc.). Often, the suspension system will include one or more shock assemblies which are used to reduce feedback from the unsprung portion of the vehicle before that feedback is transferred to the suspended portion of the vehicle, as the vehicle traverses an environment. However, the language used by those of ordinary skill in the art to identify a shock assembly used by the suspension system can differ while referring to the same (or similar) types of components. For example, some of those of ordinary skill in the art will refer to the shock assembly as a shock absorber, while others of ordinary skill in the art will refer to the shock assembly as a damper (or damper assembly).

The shock assembly often consists of a (damping) piston and piston rod telescopically mounted in a fluid filled cylinder (e.g., a housing). The fluid (e.g., damping fluid, working fluid, etc.) may be, for example, a hydraulic oil, a gas such as nitrogen, air, or the like. In one embodiment, the shock assembly will include a mechanical spring (e.g., a helically wound spring that surrounds or is mounted in parallel with the body of the shock assembly). In one embodiment, the shock assembly will include an air spring. In one embodiment, the shock assembly will include both a mechanical spring and an air spring.

In its basic form, the suspension is used to increase ride comfort, performance, endurance, component longevity, and the like. In general, the force of jarring events, rattles, vibrations, jostles, and the like which are encountered by the portion of the vehicle, device, or the like that is in contact with the surface are reduced or even removed as it transitions through the suspension before reaching suspended portions of the vehicle, device, or the like to include components such as seats, steering wheels/handlebars, pedals/foot pegs, fasteners, drive trains, engines, and the like.

For example, on a wheeled vehicle, a portion of the wheel (or tire) will be in contact with the surface being traversed (e.g., pavement, dirt, gravel, sand, mud, rocks, etc.) while a shock assembly and/or other suspension system components will be coupled between a wheel retaining assembly and the suspended portion of the vehicle (often a portion of the vehicle frame and associated systems, the seat, handlebars, pedals, controls, steering wheel, interior, etc.).

In a snow machine, a portion of the track and/or the skis that will be in contact with the surface being traversed (e.g., snow, ice, etc.) while a shock assembly and/or other suspension components will be coupled between a track retaining assembly (and similarly the skis retaining assembly) and the suspended portion of the vehicle (usually including the engine and associated systems, the seat, handlebars, etc.).

In a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like).

The term initial sag settings or "sag" refers to a predefined ride height and suspension geometry based on the initial compression of one or more shock assemblies of the suspension system for a given vehicle, device, or the like when it is within its normal load envelope configuration (e.g., with a rider/driver/user and any initial load weight). Once the sag is established, it will be the designated ride height until and unless the sag is changed.

The initial sag is usually established by the manufacturer. The sag can then be modified and/or adjusted by an owner, a mechanic, or the like. For example, an owner can modify the sag to designate a new normal ride height based on a use purpose, load requirements that are different than the factory load configuration, an adjustment modification and/or replacement of one or more of the suspension components, a change in tire size, a performance adjustment, aesthetics, and the like.

In one embodiment, the initial manufacturer will use sag settings resulting in a pre-established ride height based on vehicle, device, or the like use, size, passenger capacity, load capacity, and the like. For example, a truck (side-by-side, car, bicycle, motorcycle, snowmobile, or the like) may have a pre-established sag based on an expected load (e.g., a number of passengers, an expected cargo requirement, etc.).

Regardless of the vehicle, device, or the like, once the sag is established, in a static situation the ride height of the expectedly loaded vehicle, device, or the like should be at or about the established sag. For example, when in motion, the ride height will change as the vehicle travels over the surface, and while the suspension system is used to reduce the transference of any input forces received from the surface to the rest of the vehicle it is also used to maintain the vehicle's sag. Additional information regarding sag and sag setup can be found in U.S. Pat. Nos. 8,838,335 and 10,759,247; the contents of which are incorporated by reference herein, in their entirety.

As utilization scenarios change, one or more shock assemblies of the suspension system can be adjusted for different characteristics based on the use type of the vehicle, device, or the like, device, terrain, purpose (e.g., rock crawl, normal use, race set-up, hill climb, etc.), and the like. This modification would result in a modified personal sag setting. For example, a downhill mountain bike rider (motocross rider, off-road truck driver, side-by-side rider, snow machine racer, etc.) would want a suspension configuration with a large range of motion and aggressive rebound and compression speeds to maintain as much contact as possible between the tires and the ground by absorbing the terrain events such as bumps, ruts, roots, rocks, dips, etc. while reducing the impacts felt at the suspended portion and also have the suspension return to its personal sag setting as quickly as possible in preparation for the next encounter.

In contrast, a flat (or smooth terrain) rider would want a firmer suspension configuration with a very small range of motion to provide feel for the grip of the tire, maintain friction and/or aerodynamic geometries, and the like, in order to obtain the maximum performance from the vehicle, device, or the like.

In one embodiment, there may be times where changes to a suspension component are desired during a given ride/drive. For example, a bike rider in a sprinting scenario would often want to firm up or possibly even lockout the suspension component to remove the opportunity for rider induced pedal bob. Similarly, a user of a snowmobile (or other rear-suspended vehicle) would often want to firm up and even lockout the suspension component coupled with the rear track to traverse deep snow (or sand, gravel, etc.), to main the connection between the terrain and the tread (or other drive component).

With respect to the term lockout, for purposes of the following discussion, lockout refers to the most restricted flow state attainable or desirable. Thus, in one embodiment, lockout refers to a stoppage of all fluid flow through a given flow path. However, in another embodiment, lockout does not stop all the fluid flow through a given flow path. For example, a manufactured component may not be able to stop all fluid flow due to tolerances, or a manufacturer (designer, etc.) may not want to stop all fluid flow for reasons such as lubrication, cooling, etc. Similarly, a lockout state could be a "perceived lockout"; that is, the flow area through a flow path of the adjustable shock assembly has been reduced to a minimum size for a given adjustable shock assembly, machine, environment, speed, performance requirement, etc. For example, in one "perceived lockout" most, but not all, of the fluid flow is minimized while in another "perceived lockout" the fluid flow is reduced by only half (or a third, quarter, three-quarters, or the like). Additional details regarding shock assembly lockout is found in U.S. Pat. No. 11,162,555 which is incorporated herein by reference in its entirety.

The term "active", as used when referring to a valve or shock assembly component, means adjustable, manipulatable, etc., during typical operation of the valve. For example, an active valve can have its operation changed to thereby alter a corresponding shock assembly characteristic damping from a "soft" setting to a "firm" setting (or a stiffness setting somewhere therebetween) by, for example, adjusting a switch in a passenger compartment of a vehicle, device, or the like. Additionally, it will be understood that in some embodiments, an active valve may also be configured to automatically adjust its operation, and corresponding shock assembly damping characteristics, based upon, for example, operational information pertaining to the vehicle, device, or the like and/or the suspension with which the valve is used.

Similarly, it will be understood that in some embodiments, an active valve may be configured to automatically adjust its operation, and corresponding shock assembly damping characteristics, based upon received user input settings (e.g., a user-selected "comfort" setting, a user-selected "sport" setting, and the like). In many instances, an "active" valve is adjusted or manipulated electronically (e.g., using a powered solenoid, electric motor, poppet, or the like) to alter the operation or characteristics of a valve and/or other component. As a result, in the field of suspension components and valves, the terms "active", "electronic", "electronically controlled", and the like, are often used interchangeably.

The term "manual" as used when referring to a valve or shock assembly component means manually adjustable, physically manipulatable, etc., without requiring disassembly of the valve, damping component, or shock assembly which includes the valve or damping component. In some instances, the manual adjustment or physical manipulation of the valve, damping component, or shock assembly which includes the valve or damping component, occurs when the valve is in use. For example, a manual valve may be adjusted to change its operation to alter a corresponding shock assembly damping characteristic from a "soft" setting to a "firm" setting (or a stiffness setting somewhere therebetween) by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the device".

It should further be understood that a suspension system may also be referred to using one or more of the terms "passive", "active", "semi-active" or "adaptive". As is typically used in the suspension art, the term "active suspension" refers to a suspension which controls the vertical movement. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle.

Rather, in a "semi-active suspension", the characteristics of the suspension (e.g. the firmness of the suspension) are altered during typical use to accommodate conditions of the terrain and/or the vehicle. Additionally, the term "passive suspension", refers to a suspension in which the characteristics of the suspension are not changeable during typical use. For example, no motive force/actuator is employed to adjust (e.g. raise or lower) the height of a wheel with respect to the vehicle. As such, it will be understood that an "active valve", as defined above, is well suited for use in a "pure active suspension" or a "semi-active suspension".

In the following discussion, one or more of the component of the dual piston shock assembly may be active and/or semi-active. In general, an active and/or semi-active component will have one or more electronically adjustable features controlled by a motive component such as a solenoid, stepper motor, electric motor, or the like. In operation, the active and/or semi-active component will receive an input command which will cause the motive component to move, modify, or otherwise change one or more aspects of one or more electronically adjustable features.

In one embodiment, the dual piston shock assembly may be used in active valve suspensions and components, and may include base valves, compression valves, rebound valves, and the like. Embodiments of different active valve suspension and components where the dual piston shock assembly may be utilized are disclosed in U.S. Pat. Nos. 8,838,335; 9,353,818; 9,682,604; 9,797,467; 10,036,443; 10,415,662; the content of which are incorporated by reference herein, in their entirety.

Conventionally, solving high shaft speed cavitation (e.g., the pressure differential) in a shock assembly included a number of different approaches such as, but not limited to, introducing cavitation barrier type devices, increasing the pressure on the nitrogen gas side of an internal floating piston (IFP) (up to values such as, but not limited to 200 psi, etc.), increasing the pressure by some other means such as, but not limited to, stiffening a shim stack of the piston (e.g., increasing the shim cracking (or opening) pressures, etc.), reducing potential piston speeds within the main damper, and the like.

However, these solutions only move the pressure differential problem into a different performance range of the shock assembly, e.g., low shaft speed performance. That is, ramping up the pressures to address high shaft speed pressure differential issues will cause an imbalance of pressures at lower shaft speeds. Thus, compensating for the higher shaft speeds by increasing pressure within the system will typically translate to an increase in harshness in the shock assembly during normal operation. In other words, the increased pressure will cause additional stiffness in the shock assembly, and as such, the softest damping characteristics and shock assembly performance will be lost.

Sometimes, the pressure differential that occurs during a high shaft speed event is also based on the shock assembly architecture. That is, the pressure differential will occur during the rebound stroke or compression dependent upon where the reservoir chamber is located with respect to the compression chamber.

For example, when the reservoir is coupled below the piston there is no cavitation in a compression stroke. That is, when the piston is traveling in the compression direction, fluid is pushing up against a hard stop so there is nowhere for that pressure to go other than across the piston. However, on the rebound stroke, there can be a pressure differential (as the gas pressure of the IFP is driving the fluid from the reservoir to the damper chamber) that results in rebound cavitation.

In contrast, when the reservoir is coupled above the piston there is no cavitation in a rebound stroke. That is, when the piston is traveling in the rebound direction, fluid is pushing up against a hard stop so there's nowhere for that pressure to go other than across the piston. However, on the compression stroke, there can be a pressure differential (as the gas pressure of the IFP is driving the fluid from the reservoir to the damper chamber) that results in compression cavitation.

Referring now to FIG. 1, a perspective view of a dual piston shock assembly 100 is shown in accordance with an embodiment. In one embodiment, dual piston shock assembly 100 is a coil-over shock assembly, such as, for example, a FOX 2.0 zero QS3-R shock assembly with a velocity-sensitive shimmed damping system, one or more coil-over springs 17, a spring preload adjuster 18, and a fluid reservoir 25. Although in one embodiment the dual piston shock assembly 100 is described as coil-over style shock assembly. In another embodiment, the dual piston shock assembly 100 is a FOX load optimizing air technology (FLOAT) air shock assembly with a reservoir. In general, an air shock assembly is a high-performance shock assembly that use air as springs, instead of heavy steel coil springs or expensive titanium coil springs. In another embodiment, the dual piston shock assembly 100 may be another type of shock assembly such as, but not limited to, a stand-alone fluid damper assembly, a coil sprung adjustable shock assembly, an air sprung fluid damper assembly, a twin-tube shock assembly, or the like. In one embodiment, fluid reservoir 25 is a remote fluid reservoir.

In general, dual piston shock assembly 100 includes attachment features such as, in one embodiment, a chassis mount (e.g., upper eyelet 5) and a frame mount (e.g., lower eyelet 10) which allow dual piston shock assembly 100 to be coupled between the unsprung portion of the suspension (e.g., the components of the suspension affected by, or in contact with, the terrain) and the sprung portion. In one embodiment, if the dual piston shock assembly 100 is installed in an inverted configuration, upper eyelet 5 would be a frame mount and lower eyelet 10 would be the chassis mount.

In one embodiment, dual piston shock assembly 100 includes body 12, a body cap 20, and a fluid reservoir 25 fluidly coupled with the body 12.

A configuration of an external and/or side fluid reservoir 25, including a floating piston, is described in U.S. Pat. No. 7,374,028 the content of which is incorporated by reference herein, in its entirety.

In one embodiment, dual piston shock assembly 100 optionally includes a compression adjuster 35 and/or a rebound adjuster 16. In one embodiment, the components shown as being associated with dual piston shock assembly 100 may also be included in one or more other active and/or semi-active shock assemblies of a vehicle, device, or the like, upon which dual piston shock assembly 100 is coupled.

For additional detail and description of a shock absorber assembly, see, as an example, U.S. Pat. No. 10,576,803 the content of which is incorporated by reference herein, in its entirety. For additional detail and description of position-sensitive shock absorber/damper, see, as an example, U.S. Pat. No. 6,296,092 the content of which is incorporated by reference herein, in its entirety.

For additional detail and description of adjustable compression and/or rebound damping, preload, crossover, bottom-out, and the like for a shock absorber/damper, see, as an example, U.S. Pat. No. 10,036,443 the content of which is incorporated by reference herein, in its entirety.

In one embodiment, dual piston shock assembly 100 is part of a suspension system including one or more electronically actuated components, interactive components, and/or control features such as one or more of: a user interface, active and/or semi-active shock assemblies, a controller, one or more sensor(s), a display, a power source, smart components, and the like.

In general, the one or more sensor(s) could be used to monitor and/or measure things such as temperature, voltage, current, resistance, noise (such as when a motor is actuated, fluid flow through a flow path, engine knocks, pings, etc.), positions of one or more components of a vehicle, device, or the like (e.g., shock positions, ride height, pitch, yaw, roll, etc.), etc. In one embodiment, the one or more sensor(s) could be forward looking terrain, vibrations, bump, impact event, angular measurements, and the like.

Additional information for suspension systems, sensors, and their components as well as adjustment, modification, and/or replacement aspects including manually, semi-actively, semi-actively, and/or actively controlled aspects and wired or wireless control thereof is disclosed in U.S. Pat. Nos. 7,484,603; 8,838,335; 8,955,653; 9,303,712; 10,036,443; 10,060,499; 10,443,671; and 10,737,546; the content of which is incorporated by reference herein, in their entirety. Further, sensors and valves, or principles, of patents and other documents incorporated herein by reference, may be integrated one or more embodiments hereof, individually or in combination.

In one embodiment, one or a plurality of component(s) of the suspension system are also smart component(s). In one embodiment, the smart component(s) will include connective features that allow them to communicate wired or wirelessly with one or more of the electronically actuated components, interactive components, control features, and/or the like.

Although components of FIG. 1, are shown in given locations in accordance with one embodiment, in other embodiments, one, some, or all of the components shown in FIG. 1 could be inverted, located in other locations, one or more components could be separated into two or more pieces and dispersed, etc. The use of the locations of the components as shown in FIG. 1 is indicative of one embodiment, which is provided for purposes of clarity.

Figure 2:
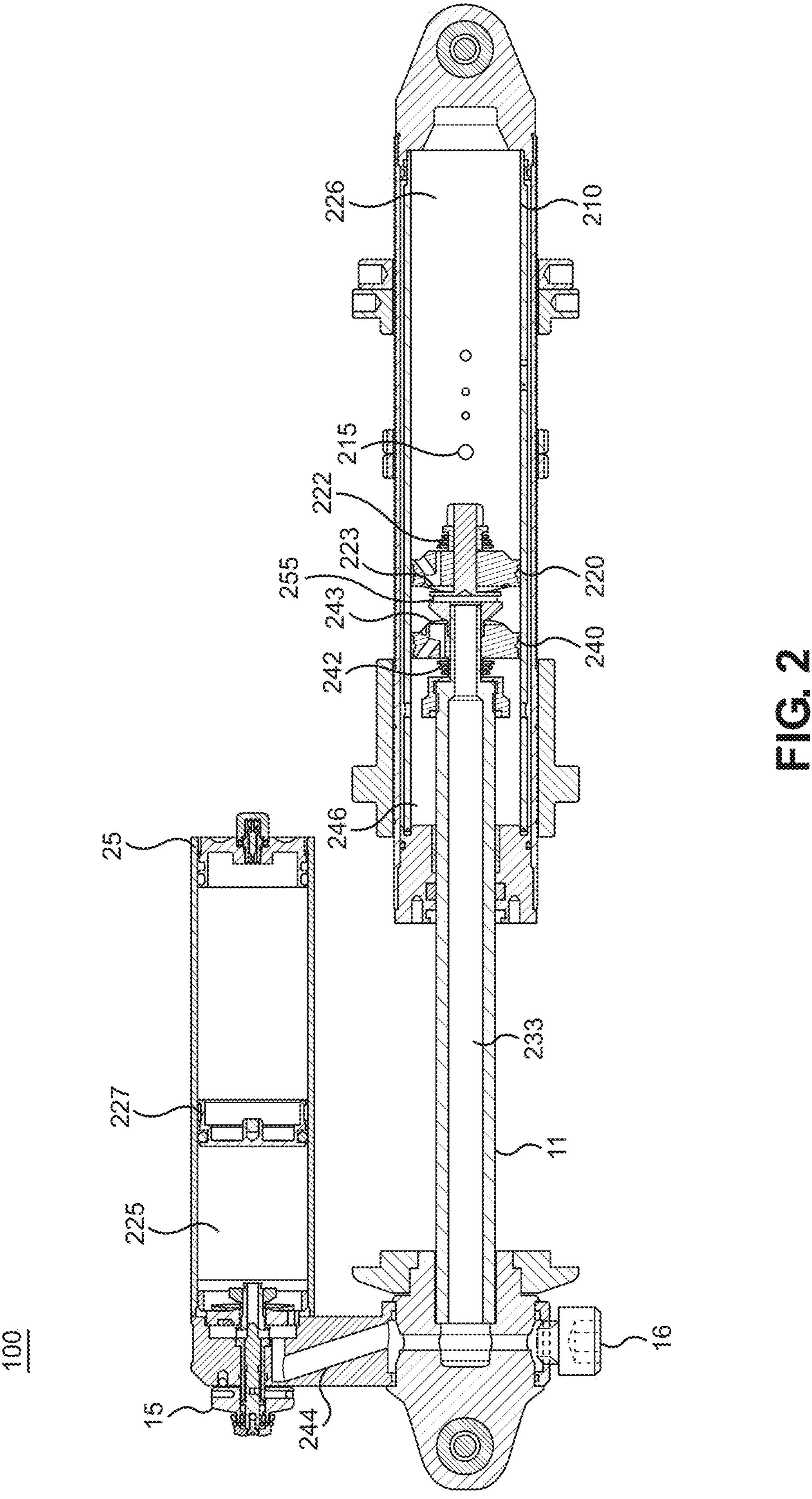
FIG. 2 is a cross-section view of the dual piston shock assembly of FIG. 1, in accordance with an embodiment.

With reference now to FIG. 2, a cross-section view of an inverted dual piston shock assembly 100 of FIG. 1 is shown in accordance with an embodiment. For purpose of clarity, in the discussion of FIG. 2, all of the components described in FIG. 1 are incorporated by reference in their entirety. In one embodiment, the cross-sectional view shows a portion of the chamber 210 of body 12 that holds the working fluid, a portion of the reservoir chamber 225 of fluid reservoir 25 that holds the working fluid, as well as the flow paths therebetween (e.g., flow path 233 internal to shaft 11 and flow paths 244 in the body cap 20). In one embodiment, the optional compression adjuster 15 valving for controlling the flow rate is shown within flow path 244 between chamber 210 and reservoir chamber 225.

In one embodiment, coil-over spring 17 provides an expansive (e.g., spring) force on the dual piston shock assembly 100. In one embodiment, dual piston shock assembly 100 includes a dual piston assembly (e.g., a compression piston 220, a rebound piston 240, and a reserve port 255) coupled with the shaft 11, where the dual pistons are located somewhere within the chamber 210 of body 12. In one embodiment, when installed, the resting sag length of the mounted dual piston shock assembly 100 is maintained in compression by the weight of the body it is suspending (e.g., the sprung portion of the vehicle), and in expansion by the "spring" force produced by the expansion component (e.g., coil-over spring 17).

In one embodiment, fluid reservoir 25 is fluidly coupled with the chamber 210 via flow path 233 internal to shaft 11 and flow paths 244 through body cap 20. In one embodiment, the fluid reservoir 25 has a reservoir chamber 225 that is divided by an IFP 227. In one embodiment, one side of the IFP 227 divided reservoir chamber 225 is filled with a pressurized gas (e.g., nitrogen, or the like) and the other side of reservoir chamber 225 is fluidly coupled with chamber 210 of body 12 via flow paths 233 and 244 and contains working fluid. In general, the IFP 227 keeps the pressurized gas from mixing with the working fluid.

In one embodiment, compression piston 220 includes a compression piston check shim 222 and a compression piston valve stack 223. In one embodiment, rebound piston 240 includes a rebound piston check shim 242 and a rebound piston valve stack 243.

In one embodiment, the cracking pressures of one or both of compression piston valve stack 223 and rebound piston valve stack 243 is based on the rigidity of each of the two independent stacks. In one embodiment, the cracking pressures of one or both of compression piston valve stack 223 and rebound piston valve stack 243 can be adjusted by varying the diameter of the footprint of the shimstack. For example, the fluid pressure acting on the shimstack is adjustable based on the flat plate area of the shim that can be contacted by the working fluid. The smaller the flat plate area, the higher the cracking pressure. In one embodiment, changing the flat plate area of the shim that can be contacted by the working fluid is done by changing the location and interactive portion of the outlet cover with respect to the outlet cover shimstack.

In one embodiment, the cracking pressure can also be tuned by adjusting the outer diameter (OD) or thickness of the deload shim (e.g., the innermost shim) to add or reduce a preload pressure required to open the flow path (e.g., the cracking pressure).

In one embodiment, compression piston valve stack 223 is set to a given cracking pressure for the compression piston 220. In other words, the compression piston valve stack 223 is used to set and/or control the compression damping characteristics of the dual piston shock assembly 100. In one embodiment, a compression adjuster 15 is coupled with the dual piston shock assembly 100 and is used to provide an adjustment capability to the compression damping characteristics of the dual piston shock assembly 100. In one embodiment, there is no compression adjuster 15 coupled with the dual piston shock assembly 100.

In one embodiment, compression adjuster 15 will modify the size of the flow path into the fluid reservoir 25 thereby adjusting the compression characteristics (e.g., firm, soften, lock out, etc.) of the dual piston shock assembly 100.

In one embodiment, compression piston check shim 222 allows unrestricted flow through the compression valving of the compression piston 220 during the rebound stroke. In other words, during a rebound stroke, the compression piston 220 will provide little to no restriction of the fluid flow as the shaft 11 moves through the chamber 210.

In one embodiment, rebound piston valve stack 243 is set to a given cracking pressure for the rebound piston 240. In other words, the rebound piston valve stack 243 is used to set and/or control the rebound damping characteristics of the dual piston shock assembly 100. In one embodiment, a rebound adjuster 16 is coupled with the dual piston shock assembly 100 and is used to provide an adjustment capability to the rebound damping characteristics of the dual piston shock assembly 100. In one embodiment, there is no rebound adjuster 16 coupled with the dual piston shock assembly 100.

In one embodiment, rebound adjuster 16 will modify the cracking pressure of the rebound piston valve stack 243 thereby adjusting the rebound characteristics (e.g., firm, soften, etc.) of the dual piston shock assembly 100.

In one embodiment, there is both a compression adjuster 15 and a rebound adjuster 16 coupled with the dual piston shock assembly 100.

In one embodiment, compression adjuster 15 and/or rebound adjuster 16 are manual adjusters that receive manual inputs. E.g., a user turns a knob that mechanically modifies a damping characteristic. In one embodiment, compression adjuster 15 and/or rebound adjuster 16 are electronically actuated. E.g., a signal is received by an actuator which modifies a damping characteristic. In one embodiment, the signal can be received from a transmitter wirelessly coupled with the dual piston shock assembly 100. In one embodiment, the signal can be received from a transmitter having a wired connection.

In one embodiment, rebound piston check shim 242 allows unrestricted flow through the compression valving of the rebound piston 240 during the compression stroke. In other words, during a compression stroke, the rebound piston 240 will provide little to no restriction of the fluid flow as the shaft 11 moves through the chamber 210.

In one embodiment, reserve port 255 provides a fluid port between the chamber 210 and the fluid reservoir 25 via a flow path 233 located within the axis of shaft 11 to form a fluid reservoir circuit.

In one embodiment, the compression piston 220, rebound piston 240, and reserve port 255 are coupled to shaft 11 to form the dual piston architecture. In one embodiment, of the dual piston architecture, the compression piston 220 is coupled with the shaft closest to the bottom of the shock, the rebound piston 240 is coupled with the shaft inboard from the compression piston 220 and the reserve port 255 is coupled with the shaft between the compression piston 220 and the rebound piston 240.

In one embodiment, the dual piston architecture as shown in FIG. 2 allows the fluid reservoir 25 to be fluidly coupled (via reserve port 255) in a location below the rebound piston 240 for the rebound stroke while simultaneously being fluidly coupled (via reserve port 255) in a location above the compression piston 220 for the compression stroke.

In another embodiment, such as an inverted shock assembly configuration, the orientation of the compression piston 220 and rebound piston 240 could be reversed about the reserve port 255 such that the fluid reservoir 25 is fluidly coupled (via reserve port 255) in a location below the rebound piston 240 for the rebound stroke while simultaneously being fluidly coupled (via reserve port 255) in a location above the compression piston 220 for the compression stroke.

In one embodiment, dual piston shock assembly 100 includes optional internal bypass valving 215. In general, bypass valving 215 includes a surrounding body that communicates with the chamber 210 through entry and exit pathways. The bypass valving 215 permits damping fluid to travel from a first side of the compression piston 220 and rebound piston 240 to the other side without traversing flow paths that may otherwise be traversed in a compression and/or rebound stroke. In some instances, multiple bypasses are used with a single damper and the entry pathways for each may be staggered axially along the length of the chamber 210 in order to provide an ever-increasing amount of dampening (and less bypass) as the piston moves through its compression and/or rebound stroke and towards one or both ends of the chamber 210. For additional detail and description of bypass valving, see, as an example, U.S. Pat. No. 9,353,818 the content of which is incorporated by reference herein, in its entirety.

In one embodiment, dual piston shock assembly 100 includes an optional bottom out valving, such as a bottom out cup, or the like. In general, bottoming out refers to an impact between the shaft 11 and/or pistons thereon and the chamber 210. In one embodiment, a bottom out cup is provided at a lower end of chamber 210 for operation in conjunction with a bottom out piston. As the bottom out piston enters and seals the cup, increased dampening takes place as the path of fluid from the cup back into the chamber 210 of the shock is limited, in one embodiment, to a blow-off valve and/or an active valve. In another embodiment, communication is selectively permitted between fluid in the sealed bottom out cup and the rebound portion of the chamber 210. Additional information regarding bottom-out features and control can be found in U.S. Pat. No. 11,131,361 the content of which are incorporated by reference herein, in its entirety.

Although components of FIG. 2 are shown in given locations in accordance with one embodiment, in other embodiments, one, some, or all of the components shown in FIG. 2 could be inverted, located in other locations, one or more components could be separated into two or more pieces and dispersed, etc. The use of the locations of the components as shown in FIG. 2 is indicative of one embodiment, which is provided for purposes of clarity.

Figure 3:
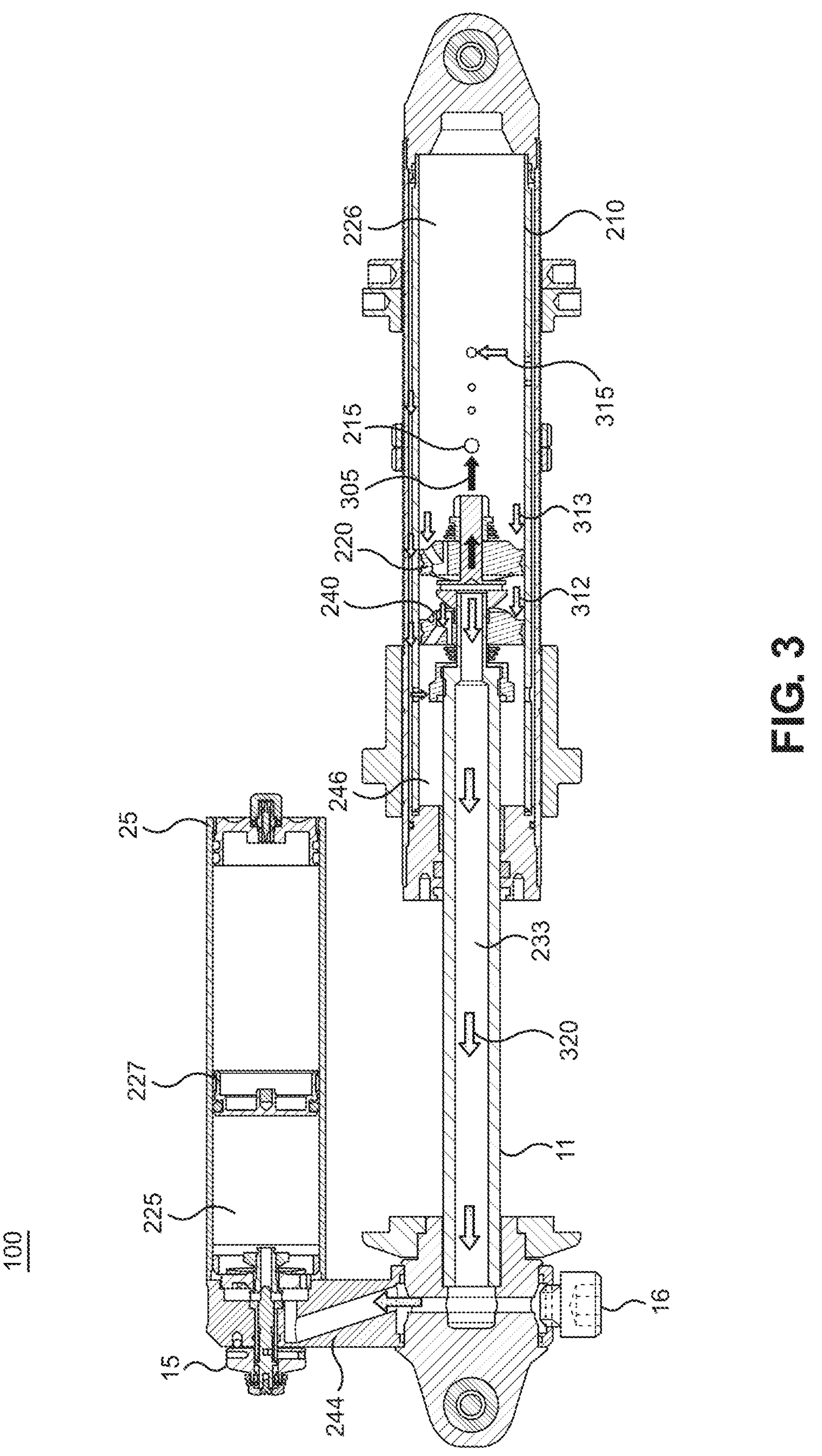
FIG. 3 is a cross-section view of the dual piston shock assembly of FIG. 2 during a compression stroke, in accordance with an embodiment.

With reference now to FIG. 3, a cross-section view of the dual piston shock assembly 100 of FIG. 2 during a compression stroke is shown in accordance with an embodiment.

In general, the dual piston shock assembly 100 resides in an equilibrium where compression piston 220 and rebound piston 240 and a portion of shaft 11 are located within chamber 210 and divide the chamber 210 into a compression side 226 and a rebound side 246. For example, when the sag is initially established, the amount of shaft 11 within chamber 210 will be set (and as such, the resting location of compression piston 220 and rebound piston 240).

The distance of travel available for compression piston 220 and rebound piston 240 within the chamber 210 is the stroke of dual piston shock assembly 100. This travel distance is broken down into compression stroke and rebound stroke.

In general, a compression and/or rebound stroke occurs when a component to which the dual piston shock assembly 100 is coupled encounters an event.

For example, if the dual piston shock assembly 100 is suspending a vehicle body (frame, etc.) from a wheel (track, etc.), a compression event would be the wheel encountering a bump in its path of travel. When the bump is encountered, the wheel will be pushed toward the vehicle body. This closing-of-distance movement translates into a compression stroke occurring at the dual piston shock assembly 100 as the dual piston shock assembly 100 contracts to reduce and/or absorb the energy imparted by the encounter with the bump.

Thus, during a compression stroke, the shaft 11 is pushed further into chamber 210 toward the compression side 226 as shown by directional arrow 305.

After the encounter with the bump, the dual piston shock assembly 100 will enter a rebound stroke portion of operation as the dual piston shock assembly 100 returns to its original sag length. For example, the expansion component (e.g., coil-over spring 17) which was compressed by shaft 11 moving further into chamber 210, provides the spring force that causes the dual pistons and shaft to move back toward their original location within the chamber 210 of body 12 The rebound stroke is discussed in further detail with respect to FIG. 4.

In another example, the dual piston shock assembly 100 may initially enter a rebound stroke when a rebound type event is encountered. For example, if the dual piston shock assembly 100 is suspending a vehicle body (frame, etc.) from a wheel (track, etc.), a rebound event would be the wheel encountering a hole in its path of travel. When the hole is encountered, the wheel will fall away from the vehicle body. This increasing-of-distance movement translates into a rebound stroke occurring at the dual piston shock assembly 100 as the dual piston shock assembly 100 elongates to reduce and/or absorb the gravitational energy that occurs during the encounter with the hole.

After the encounter with the hole, the dual piston shock assembly 100 will enter a compression stroke portion of operation as the dual piston shock assembly 100 returns to its original sag length.

In general, events can be high frequency events such as the traversing of washboards, rolling bumps or divots, etc. Events can also be single high displacement/high shaft speed events such as jumps, potholes, sharp edged bumps or holes, etc.

Further events can include a number of rebound and compression occurrences. For example, in a jump encounter, there will be an initial compression stroke occurrence if the vehicle initially hits an incline. There will then be a rebound stroke occurrence as the vehicle is no longer in contact with the ground and the suspension is pulled down by gravity. Finally, there will be at least one more compression stroke occurrence as the vehicle lands (e.g., impacts the terrain).

Referring still to FIG. 3, as discussed herein, compression piston 220 includes the compression piston valve stack 223 which is used to control the cracking pressure for the compression piston 220 during the compression stroke. In other words, the compression piston valve stack 223 is used to set and/or control the compression damping characteristics of the dual piston shock assembly 100, e.g., firm, soften, lock out, etc. during the compression stroke.

In one embodiment, compression adjuster 15 provides an adjustment capability to the compression damping characteristics of the dual piston shock assembly 100. In one embodiment, compression adjuster 15 will modify the size of the flow path into the fluid reservoir 25 thereby adjusting the compression characteristics (e.g., firm, soften, lock out, etc.) of the dual piston shock assembly 100. In one embodiment, there is no compression adjuster 15 coupled with the dual piston shock assembly 100.

In one embodiment, rebound piston check shim 242 allows unrestricted flow 312 through the rebound valving of the rebound piston 240 during the compression stroke. In other words, during the compression stroke, the rebound piston 240 will provide little to no restriction of the fluid flow 312 as the shaft 11 moves through chamber 210 in the direction as indicated by directional arrow 305.

As the compression piston 220 and rebound piston 240 move toward the compression side, fluid will move from compression side 226 to rebound side 246 via a flow path 313 controlled by compression piston valve stack 223. As such, there will be a pressure on the side of compression piston 220 facing compression side 226 and that pressure will be the same as the pressure on the opposite side of compression piston 220 when the pressure is at or above the cracking pressure for compression piston valve stack 223.

The same balanced pressure will also be felt at rebound piston 240 as the rebound piston check shim 242 allows unrestricted flow 312 through the rebound valving of the rebound piston 240. As such, the pressure between compression piston 220 and rebound piston 240 will be balanced.

In addition, as the compression piston 220 and rebound piston 240 move toward the compression side, the incursion of the additional mass of shaft 11 will displace fluid from chamber 210. This displaced fluid will flow into reserve port 255, along flow path 233 in direction 320, and into fluid reservoir 25. As the working fluid fills the reservoir chamber 225, it will cause the IFP 227 to move further into reservoir chamber 225 causing the pressurized gas to be further compressed, and in so doing, ensure consistent, fade-free damping in most riding conditions.

In one embodiment, the displaced fluid will also be at the same balanced pressure as the fluid moving through compression piston 220 and rebound piston 240. As such, since the fluid is at (or approximately at) a pressure balance the opportunity for cavitation to occur will be significantly reduced and/or removed.

In one embodiment, the compression adjuster 15 is located in the body cap 20 flow path 244 between the chamber 210 of body 12 and the fluid reservoir 25. In one embodiment, compression adjuster 15 is used to control the flow rate of the working fluid through the flow path 244 during the compression stroke. Thus, making an adjustment to the compression adjuster 15 will change the flow rate of the working fluid flowing through flow path 244 causing a corollary adjustment of one or more damping characteristics of the dual piston shock assembly 100 during the compression stroke.

In one embodiment, instead of (or in addition to) restricting the flow through an orifice, compression adjuster 15 can vary a flow rate through an inlet or outlet passage within an electronic valve within compression adjuster 15. In other words, an electronic or active valve of optional compression adjuster 15, can be used to meter the working fluid flow (e.g., control the rate of working fluid flow) with/or without adjusting the flow rate through an orifice. Additional information regarding active and semi-active valves, including those used for compression and/or rebound stiffness adjustments, preload adjustments, bottom-out control, preload adjustment, ride height adjustment, can be found in U.S. Pat. Nos. 9,353,818 and 9,623,716 the content of which are incorporated by reference herein, in their entirety.

In one embodiment, compression adjuster 15 is electronically actuated. In one embodiment, compression adjuster 15 is mechanically actuated. In one embodiment, compression adjuster 15 is both mechanically and electronically actuated.

In one embodiment, compression adjuster 15 includes a wired communication capability. For example, in one embodiment, compression adjuster 15 receives adjustment inputs over a wired connection. In one embodiment, compression adjuster 15 includes a wireless communication capability. For example, in one embodiment, compression adjuster 15 receives adjustment input(s) via a wireless connection.

In one embodiment, when dual piston shock assembly 100 includes internal bypass valving 215, as the compression piston 220 and rebound piston 240 move toward the compression side, fluid will move from compression side 226 to rebound side 246 in direction 315 via internal bypass valving 215 thereby bypassing the compression piston 220 and rebound piston 240.

Although components of FIG. 3, are shown in given locations in accordance with one embodiment, in other embodiments, one, some, or all of the components shown in FIG. 3 could be inverted, located in other locations, one or more components could be separated into two or more pieces and dispersed, etc. The use of the locations of the components as shown in FIG. 3 is indicative of one embodiment, which is provided for purposes of clarity.

Figure 4:
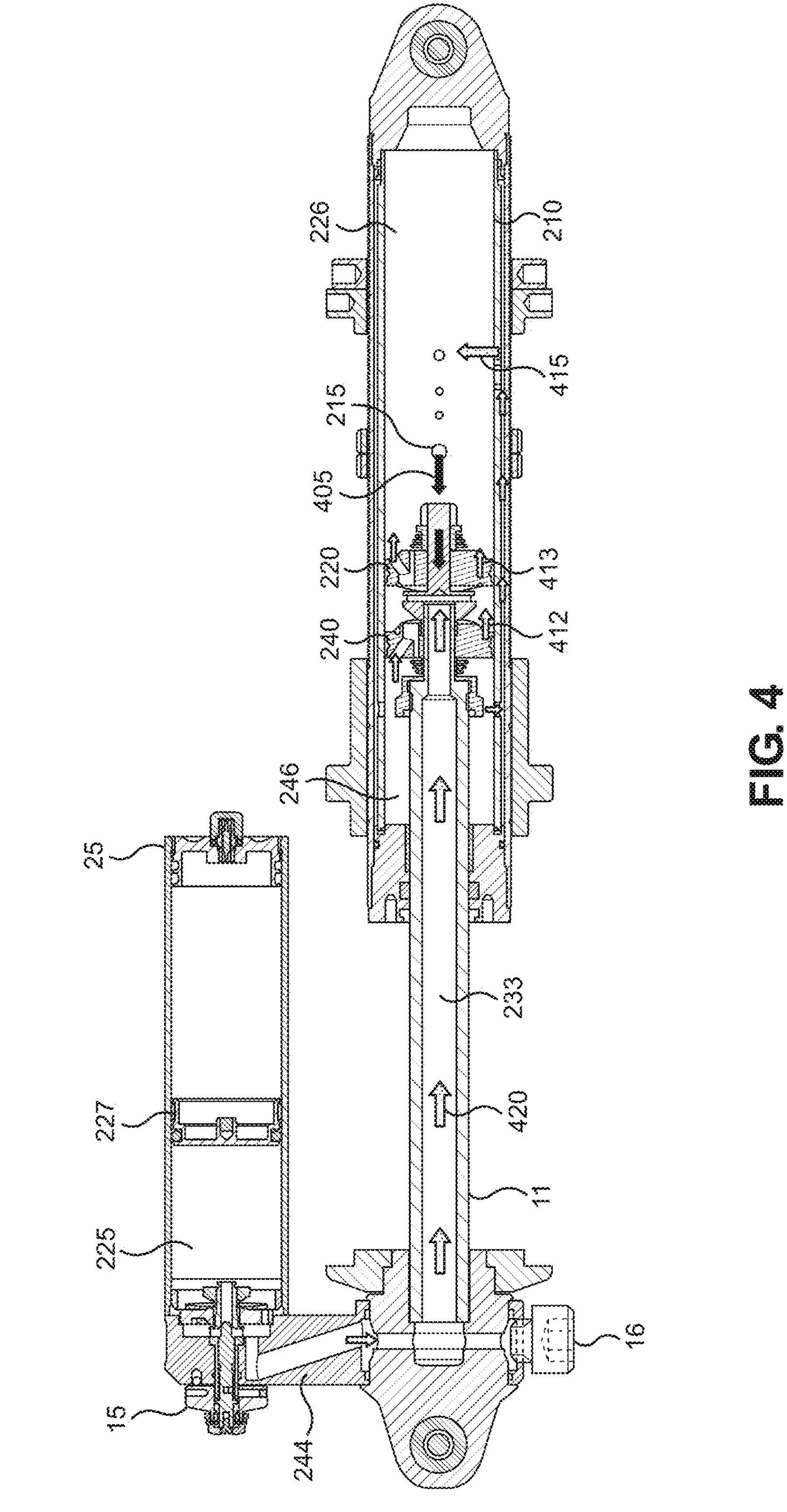
FIG. 4 is a cross-section view of the dual piston shock assembly of FIG. 2 during a rebound stroke, in accordance with an embodiment.

With reference now to FIG. 4, a cross-section view of the dual piston shock assembly 100 of FIG. 2 during a rebound stroke is shown in accordance with an embodiment. As discussed herein, rebound piston 240 includes the rebound piston valve stack 243 which is used to control the cracking pressure for the rebound piston 240 during the rebound stroke. In other words, the rebound piston valve stack 243 is used to set and/or control the compression damping characteristics of the dual piston shock assembly 100, e.g., firm, soften, etc. during the rebound stroke.

In one embodiment, rebound adjuster 16 provides an adjustment capability to the compression damping characteristics of the dual piston shock assembly 100. In one embodiment, rebound adjuster 16 will modify the cracking pressure of the rebound piston valve stack 243 thereby adjusting the rebound characteristics (e.g., firm, soften, etc.) of the dual piston shock assembly 100. In one embodiment, there is no rebound adjuster 16 coupled with the dual piston shock assembly 100.

In one embodiment, compression piston check shim 222 allows unrestricted flow 412 through the compression valving of the compression piston 220 during the rebound stroke. In other words, during the rebound stroke, the compression piston 220 will provide little to no restriction of the fluid flow 412 as the shaft 11 moves through chamber 210 in direction 405.

As the compression piston 220 and rebound piston 240 move toward rebound side 246, fluid will move from rebound side 246 to compression side 226 via flow path 413 controlled by rebound piston valve stack 243. As such, there will be a pressure on the side of rebound piston 240 facing rebound side 246 and that pressure will be the same as the pressure on the opposite side of rebound piston 240 when the pressure is at or above the cracking pressure for rebound piston valve stack 243.

The same balanced pressure will also be felt at compression piston 220 as the compression piston check shim 222 allows unrestricted flow 412 through the compression valving of the compression piston 220. As such, the pressure between compression piston 220 and rebound piston 240 will be balanced.

In addition, as the compression piston 220 and rebound piston 240 move toward the rebound side 246, the removal of some of the mass of shaft 11 will require the replacement of fluid from fluid reservoir 25 to chamber 210. This replacement fluid will flow from fluid reservoir 25, along flow path 233 in direction 420, through reserve port 255, and into chamber 210.

In one embodiment, the replacement fluid will also be at the same balanced pressure as the fluid moving through compression piston 220 and rebound piston 240. In one embodiment, since the fluid is at (or approximately at) a pressure balance the opportunity for cavitation to occur will be significantly reduced and/or removed.

In one embodiment, when dual piston shock assembly 100 includes internal bypass valving 215, as the compression piston 220 and rebound piston 240 move toward the rebound side 246, fluid will move from rebound side 246 to compression side 226 in direction 415 through internal bypass valving 215 thereby bypassing the compression piston 220 and rebound piston 240.

Although components of FIG. 4, are shown in given locations in accordance with one embodiment, in other embodiments, one, some, or all of the components shown in FIG. 4 could be inverted, located in other locations, one or more components could be separated into two or more pieces and dispersed, etc. The use of the locations of the components as shown in FIG. 4 is indicative of one embodiment, which is provided for purposes of clarity.

In one embodiment, there is a wired communication connection (such as via a wiring harness or the like) between one or more electronically actuated components, interactive components, and/or control features of dual piston shock assembly 100. For example, in one embodiment, an electronic valve of dual piston shock assembly 100 is coupled with a user interface (and/or controller, sensors, and the like) via a wiring harness and any adjustable aspect inputs received at dual piston shock assembly 100 (e.g., the changing of the rebound tunes, compression tunes, lockout, etc.) would be received over the wired connection.

In one embodiment, power might also be received over the wired connection. For example, the motor (solenoid, or the like) that operates an electronic valve would receive its power from a power source coupled with the wiring harness (e.g., the vehicle, device, or the like power supply, a power supply incorporated with a user interface, a power supply coupled with dual piston shock assembly 100, a power supply coupled with another shock assembly (or smart component, etc.), a reserve or extra power supply for auxiliary components, or the like).

Wireless

In one embodiment, there is wireless communication connectivity between the one or more electronically actuated components, interactive components, and/or control features of dual piston shock assembly 100. For example, in one embodiment, dual piston shock assembly 100 is in wireless communication with a user interface (and/or controller, sensors, and the like) without requiring a wiring harness and any adjustable aspect inputs received at dual piston shock assembly 100 (e.g., the changing of the rebound tunes, compression tunes, lockout, etc.) would be received over the wireless connection.

In one embodiment, dual piston shock assembly 100 would include its own power source and the motor (solenoid, or the like) that operates an electronic valve would receive its operating power therefrom. Thus, in one embodiment, the electronics of dual piston shock assembly 100 would be self-contained.

Hybrid Wired and Wireless

In one embodiment, the communications between one or more electronically actuated components, interactive components, and/or control features of dual piston shock assembly 100 is a combination of wired and wireless connectivity.

For example, in one embodiment, dual piston shock assembly 100 may be in wireless communication with a user interface (and/or controller, sensors, and the like) and any adjustable aspect inputs received at the dual piston shock assembly 100 (e.g., the changing of the rebound tunes, compression tunes, lockout, etc.) would be received over the wireless connection. However, the motor (solenoid, or the like) that operates any electronic components of dual piston shock assembly 100 would receive its power from a power source via a wiring harness (e.g., the vehicle, device, or the like power supply, a power supply incorporated with a user interface, a power supply coupled with dual piston shock assembly 100, a power supply coupled with another shock assembly (or smart component, etc.), a reserve or extra power supply for auxiliary components, or the like).

In another embodiment, the damping adjustments may be received via a wired connection.

In one embodiment, the motor (solenoid, or the like) that operates any electronic valves of dual piston shock assembly 100 receives its power from a power source via a wiring harness (e.g., the vehicle, device, or the like power supply, a power supply incorporated with a user interface, a power supply coupled with dual piston shock assembly 100, a power supply coupled with another shock assembly (or smart component, etc.), a reserve or extra power supply for auxiliary components, or the like).

In another embodiment, dual piston shock assembly 100 would include its own power source and the motor (solenoid, or the like) that operates an electronic valve would receive its operating power therefrom.

In one embodiment, wired or wireless components (such as for example a memory or smart component coupled with dual piston shock assembly 100) will store one or more programable (or preset) compression setting tune(s) that, when selected, cause the dual piston shock assembly 100 characteristics to be changed on the fly. In one embodiment, the dual piston shock assembly 100 characteristics are changed via a modification to one or more flow paths via electronic valves or the like.

In general, different selectable compression (and/or rebound) setting tunes can provide different compression (and/or rebound) stroke characteristics for the dual piston shock assembly 100. In one embodiment, the different compression (and/or rebound) setting tunes can make large, medium, and/or small changes to the compression (and/or rebound) stroke characteristics of the dual piston shock assembly 100. For example, one tune might be a softest compression (and/or rebound) setting, while another tune is a lockout setting.

For example, in one embodiment, one tune would be a soft mode, e.g., a shock assembly tune designed for maximum trail comfort, easy side hilling and descending. In one embodiment, other tunes would be tunes such as, but not limited to, a middle mode (e.g., a shock assembly tune designed for balanced all-around performance), a firm mode (e.g., a shock assembly tune designed for aggressive trail riding, increased load carrying capacity, etc.), a lockout, and the like.

In one embodiment, if a plurality of the shock assemblies on a vehicle, device, or the like include active shock assemblies (such as dual piston shock assembly 100) the adjustments made by the different tunes could be different for one or more of the different shock assemblies. It should be appreciated that in another embodiment, a user (and/or manufacturer, after market provider, suspension tuner, mechanic, etc.) would be able to set up the suspension tune configurations for one or more of the shock assemblies for each mode. The differences could be due to user skill, terrain type, ride format (e.g., work, fun, race, thrill, extreme, etc.), loaded weight, altitude, temperature, etc.

In one embodiment, the different tunes can be predefined for a given vehicle, device, or the like to cover different performance characteristics such as, but not limited to, smooth ride, fast ride, bumpy ride, hill climb, hill descent, and the like. In one embodiment, the different tunes may be modified by the user for more personalized performance based on aspects such as, but not limited to user skill, user body type, the vehicle, device, or the like, components on the vehicle, device, or the like, other suspension settings on the vehicle, device, or the like, location of operation, terrain type, weather, temperature, etc. In one embodiment, the tunes may be downloaded from a user's computer, mobile device, etc. In one embodiment, the tunes may be obtained via a suspension tune application, library, or the like as described in U.S. Pat. No. 11,459,050, which is incorporated herein by reference in its entirety.

In one embodiment, selecting one of the tunes causes quick, reversable, and repeatable damping changes in real-time (or near-real time) to dual piston shock assembly 100 which will change vehicle, device, or the like ride quality, performance, and/or handling.

Thus, in operation, e.g., a compression stroke the reservoir flow is connected below the piston (low pressure side). In rebound stroke the reservoir flow is connected above the piston (low pressure side). This eliminates cavitation in both compression and rebound. In so doing, one embodiment provides a fixed pressure balanced shock that is not affected by tune or base valve adjustment. An embodiment also ensures large compression forces are able to be generated for bottoming control. One embodiment further provides independent compression & rebound piston free bleed.

In other words, one embodiment solves cavitation and pressure balancing challenges by creating dual flow paths to the reservoir. In compression stroke, fluid flows through the compression piston valve stack 223 of the compression piston 220 to generate damping while the rebound piston check shim 242 of the rebound piston 240 acts as a check valve to equalize pressure and any shaft 11 displaced fluid flows through flow path 233 within shaft 11 into fluid reservoir 25.

In contrast, during a rebound stroke, fluid flows through the rebound piston valve stack 243 of the rebound piston 240 to generate damping while the compression piston check shim 222 of the compression piston 220 acts as a check valve to equalize pressure and any shaft displaced fluid flows through flow path 233 within shaft 11 from fluid reservoir 25 to chamber 210.

Thus, embodiments disclosed herein are able to avoid pressure differentials that can lead to cavitation inducing events during both compression and rebound (at high shaft speed and/or low shaft speed). Moreover, since there is no pressure differential across the dual pistons during either rebound or compression, the gas pressure of the IFP can be maintained at a pressure that is less than, half of, a quarter of or a fraction of the pressures required when there are pressure differentials. As such, the dual piston architecture further provides the non-cavitation performance without having to lose the broad range of tunability (including, but not limited to, unnecessary stiffness and/or the softest damping characteristics) of the shock assembly.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A shock assembly comprising:

a body comprising a chamber with a working fluid therein;

a dual piston assembly coupled with a shaft, said dual piston assembly comprising:

a compression piston;

a rebound piston; and a reservoir port coupled between said compression piston and said rebound piston along an axis of said shaft;

said dual piston assembly disposed in said chamber and axially movable relative to said chamber, said dual piston assembly separating said chamber into a compression side and a rebound side;

a fluid pathway internal to said shaft, said fluid pathway fluidly coupling said chamber with a reservoir via said reservoir port; and a bypass flow path, said bypass flow path fluidly coupling said compression side of said chamber with said rebound side of said chamber while bypassing said dual piston assembly.

2. The shock assembly of claim 1, wherein said compression piston comprises:

a compression piston valve stack, said compression piston valve stack comprising a cracking pressure related to a firmness characteristic during a compression stroke; and a compression piston check shim, said compression piston check shim providing a relatively unrestricted flow path through said compression piston during a rebound stroke.

3. The shock assembly of claim 1, wherein said rebound piston comprises:

a rebound piston valve stack, said rebound piston valve stack comprising a cracking pressure related to a firmness characteristic during a rebound stroke; and a rebound piston check shim, said rebound piston check shim providing a relatively unrestricted flow path through said rebound piston during a compression stroke.

4. The shock assembly of claim 1 wherein said bypass flow path is selected from a group consisting of: an internal bypass and an external bypass.

5. The shock assembly of claim 1, further comprising:

a compression adjuster, said compression adjuster configured to modify a compression damping characteristic of said shock assembly.

6. The shock assembly of claim 5, wherein said compression adjuster is a manual adjuster.

7. The shock assembly of claim 5, wherein said compression adjuster is electronically actuated.

8. The shock assembly of claim 1, further comprising:

a rebound adjuster, said rebound adjuster configured to modify a rebound damping characteristic of said shock assembly.

9. The shock assembly of claim 8, wherein said rebound adjuster is a manual adjuster.

10. The shock assembly of claim 8, wherein said rebound adjuster is electronically actuated.

11. The shock assembly of claim 1, further comprising:

a bottom-out cup.

12. A dual piston shock assembly comprising:

a body comprising a chamber with a working fluid therein;

a dual piston assembly coupled with a shaft, said dual piston assembly comprising:

a compression piston;

a rebound piston; and a reservoir port coupled between said compression piston and said rebound piston along an axis of said shaft;

said dual piston assembly disposed in said chamber and axially movable relative to said chamber, said dual piston assembly separating said chamber into a compression side and a rebound side;

a fluid pathway internal to said shaft, said fluid pathway fluidly coupling said chamber with a reservoir via said reservoir port; and a bypass flow path, said bypass flow path fluidly coupling said compression side of said chamber with said rebound side of said chamber while bypassing said dual piston assembly.

13. The dual piston shock assembly of claim 12, wherein said compression piston comprises:

a compression piston valve stack, said compression piston valve stack comprising a cracking pressure related to a firmness characteristic during a compression stroke; and a compression piston check shim, said compression piston check shim providing a relatively unrestricted flow path through said compression piston during a rebound stroke.

14. The dual piston shock assembly of claim 12, wherein said rebound piston comprises:

a rebound piston valve stack, said rebound piston valve stack comprising a cracking pressure related to a firmness characteristic during a rebound stroke; and a rebound piston check shim, said rebound piston check shim providing a relatively unrestricted flow path through said rebound piston during a compression stroke.

15. The dual piston shock assembly of claim 12, further comprising:

a compression adjuster, said compression adjuster configured to modify a compression damping characteristic of said shock assembly.

16. The dual piston shock assembly of claim 15, wherein said compression adjuster is selected from a group consisting of: a manual adjuster, an electronically actuated adjuster, and a hybrid manual and electronically actuated adjuster.

17. The dual piston shock assembly of claim 12, further comprising:

a rebound adjuster, said rebound adjuster configured to modify a rebound damping characteristic of said shock assembly.

18. The dual piston shock assembly of claim 17, wherein said rebound adjuster is selected from a group consisting of: a manual adjuster, an electronically actuated adjuster, and a hybrid manual and electronically actuated adjuster.

19. A dual piston shock assembly comprising:

a body comprising a chamber with a working fluid therein;

a dual piston assembly coupled with a shaft, said dual piston assembly comprising:

a compression piston comprising:

a compression piston valve stack, said compression piston valve stack comprising a cracking pressure related to a firmness characteristic during a compression stroke; and a compression piston check shim, said compression piston check shim providing a relatively unrestricted flow path through said compression piston during a rebound stroke;

a rebound piston comprising:

a rebound piston valve stack, said rebound piston valve stack comprising a cracking pressure related to a firmness characteristic during said rebound stroke; and a rebound piston check shim, said rebound piston check shim providing a relatively unrestricted flow path through said rebound piston during said compression stroke; and a reservoir port coupled between said compression piston and said rebound piston along an axis of said shaft;

said dual piston assembly disposed in said chamber and axially movable relative to said chamber, said dual piston assembly separating said chamber into a compression side and a rebound side;

a fluid pathway internal to said shaft, said fluid pathway fluidly coupling said chamber with a reservoir via said reservoir port; and a bypass flow path, said bypass flow path fluidly coupling said compression side of said chamber with said rebound side of said chamber while bypassing said dual piston assembly.

* * * * *